Aug. 16, 1938.　　　F. C. BEST　　　2,126,943
MOTOR VEHICLE
Filed Feb. 27, 1937　　2 Sheets-Sheet 1
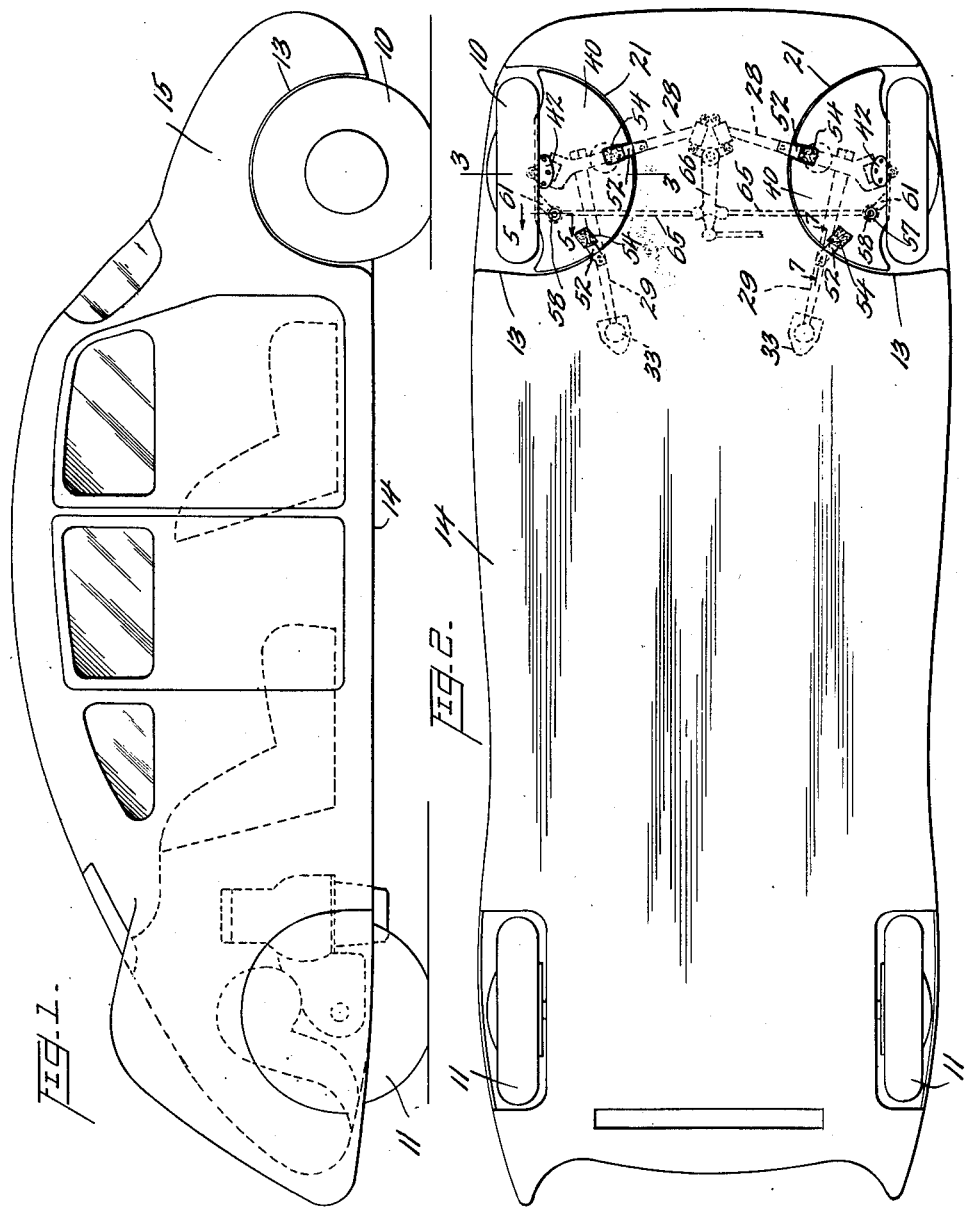
Inventor
Frank C. Best
By Watson, Cait, Morse & Grindle
Attorney Aug. 16, 1938.   F. C. BEST   2,126,943
MOTOR VEHICLE
Filed Feb. 27, 1937   2 Sheets-Sheet 2
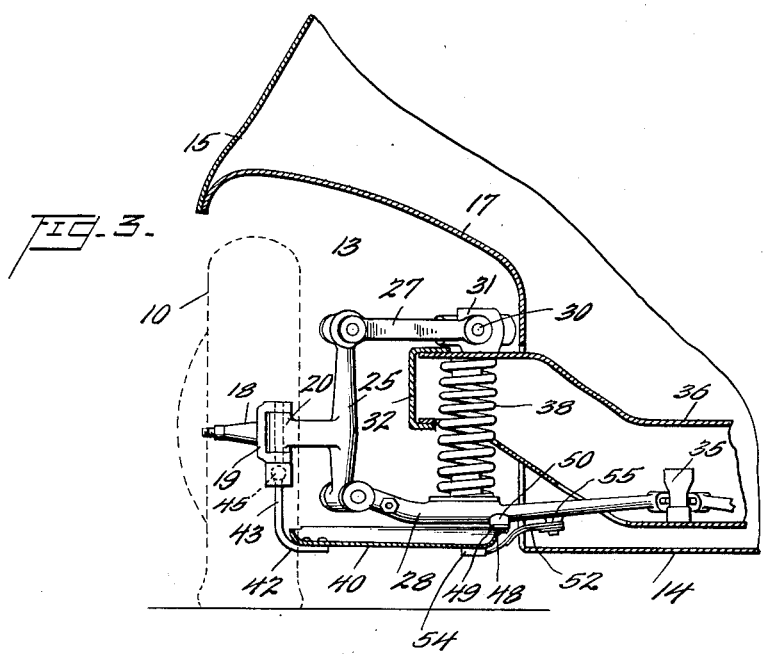
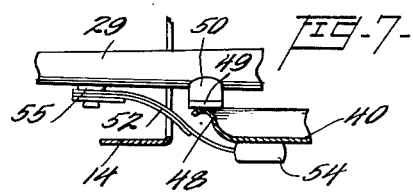
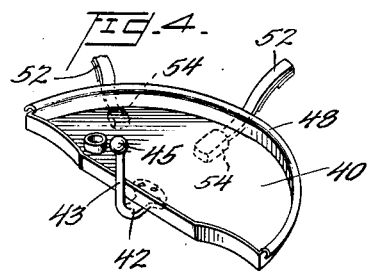
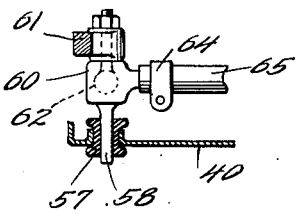
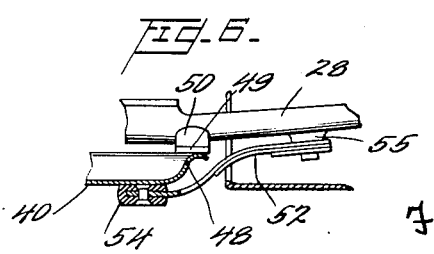
Inventor
Frank C. Best
By Watson, Cait, Morse & Grindle
Attorney Patented Aug. 16, 1938

2,126,943

UNITED STATES PATENT OFFICE 2,126,943

MOTOR VEHICLE

Frank C. Best, Detroit, Mich., assignor to Packard Motor Car Company, Detroit, Mich., a corporation of Michigan Application February 27, 1937, Serial No. 128,270

17 Claims. (Cl. 280—152)

This invention relates to motor vehicles and is more particularly concerned with improvements tending to reduce wind resistance to movement of vehicle bodies. It is the principal object of the invention to provide a generally flat and uninterrupted lower body surface so that the air may flow freely beneath the vehicle, the wheel pockets adjacent the steerable road wheels of the vehicle being closed at the lower sides thereof without interference with the normal steering and the rising and falling movements of the wheels.

It is commonly recognized that a vehicle body having a generally smooth, flat, and uninterrupted lower surface is decidedly improved from the standpoint of aerodynamic performance, and it can be shown that interruptions in the continuity of this surface, for example the wheel pocket openings, very seriously impair the efficiency of the body because of the relatively high air pressure which is established beneath the body while in motion. Thus in the case of the wheel pockets, the air flowing beneath the body tends to move upwardly into these pockets and out at the side around the vehicle wheels, causing turbulence and eddying and interfering materially with the smooth flow past the vehicle. Non-steerable road wheels offer no great difficulty in this respect since the under-surface of the body can be formed to fit fairly closely the contour of the wheel, only sufficient clearance being provided to allow free rising and falling movement of the wheels. The steerable road wheels offer considerable difficulty, however, since fairly ample pockets must be provided in order that these wheels may partake of steering movement of conventional amplitude about generally upright axes.

It is therefore an object of the instant invention to employ closure members or fairings for the underside of the wheel pockets in which the steerable road wheels are disposed, these fairings partaking of steering movement with the associated road wheels, and being subject to such slight vertical displacement as will accommodate the normal rising and falling movement of the wheels without undue reduction of road clearance. The fairings are so constructed and arranged as to be substantially continuous and coplanar with the under body panel.

Further features and objects of the invention will be apparent from the following description taken in connection with the accompanying drawings, in which Figure 1 is a side elevation of a vehicle body constructed to afford high aerodynamic efficiency and to which the instant invention may be readily applied;

Figure 2 is a bottom plan view of the vehicle shown in Figure 1 illustrating certain details of the invention;

Figure 3 is a vertical sectional view taken substantially on the line 3—3 of Figure 2;

Figure 4 is a view in perspective of certain of the elements shown in Figure 3;

Figure 5 is a sectional view taken on the line 5—5 of Figure 2;

Figure 6 is an enlarged view of a portion of the structure shown in Figure 3; and Figure 7 is a sectional view taken on the line 7—7 of Figure 2.

For convenience in describing the invention, reference is made to the vehicle chosen for illustration in the accompanying drawings and specific language is employed. It will nevertheless be appreciated that the invention in its broader aspect is not limited to this precise construction and arrangement. For example, the invention is shown as applied to a vehicle employing a wheel suspension of the so-called parallel link type, and is particularly adapted for use with such a wheel suspension. However, by suitable modification of the detailed structure, the devices shown herein may be accommodated to other types of suspension, for example to the more conventional rigid axle suspension, and it is not intended that the invention shall be restricted in this or in other respects except to the extent of the limitations imposed by the appended claims.

The vehicle body shown in Figures 1 and 2 is described and claimed in the copending application of Elliott G. Reid, Serial No. 127,540, filed February 24, 1937, and is of the type in which the power plant is located at the rear, the steerable road wheels 10 being located at the forward end of the vehicle and the non-steerable driving road wheels 11 being disposed adjacent the power plant at the rear of the vehicle. The under body panel 14 is generally flat and continuous, but may be formed in sections or with such removable portions as may be necessary to afford access to the interior of the vehicle from underneath, for example, in the event the invention is applied to a motor vehicle in which the power plant is at the forward end, to render the conventional propeller shaft readily accessible. The wheel pocket openings 13 in the side panels 15 at the nose of the body are shaped to conform generally to the contour of the road wheels 10 and an inner panel 17 may extend between each side panel 15 and the under panel 14 to house the wheels and the major portion of the wheel suspension. The panel 14 is cut away to provide wheel pocket openings 21, each of these openings being of generally semi-circular outline described about the axis of the associated steering knuckle as a center.

The wheel suspension is essentially similar to that disclosed in the application of Walter R. Griswold, Serial No. 45,347, filed October 16, 1935. Each steerable road wheel 10 is journalled on a wheel spindle 18 which is formed integrally with one member 19 of a steering knuckle, the other member 20 being constituted by a laterally extended arm on a wheel supporting member 25. Upper and lower links 27 and 28 are pivoted at their outer ends to the wheel supporting member and at their inner ends to the frame of the vehicle, so as to permit rising and falling movement of the road wheel. For example, each upper link 27 may be secured to the oscillatable shaft 30 of a shock absorber indicated at 31, the latter being secured in position on the upper face of a side sill 32 forming part of the frame, whereby the shock absorber is actuated as the link 27 rises and falls. The lower link 28 is pivoted to a bracket 35 which is in turn secured to the lower side of a cross frame member 36 extending between the side sills; a torque arm 29, rigid with each link 28, is pivoted to the adjacent side sill 32 as indicated at 33. The axes of pivotal connection of the links 27 and 28 to the frame are inclined at an acute angle with respect to the central, longitudinal, vertical plane of the vehicle and these axes are parallel to each other and to the axes of pivotal connection between the links and the wheel carrying member 25. A coil spring 38 is interposed between the link 28 and the cross frame member 36 to yieldingly resist rising movement of the wheels. It will be understood that this wheel suspension forms no part of the present invention except to the extent that the structure hereinafter described cooperates with the elements of the suspension.

A closure plate or fairing 40, preferably of generally semi-circular outline coaxial with and of slightly less radius than the opening 21 in the panel 14, is associated with each of the road wheels 10 and is so disposed that when the road wheel occupies its normal position, the lower surface of the fairing 40 is substantially coextensive and coplanar with the lower surface of the under panel 14 of the body. The means for so supporting this fairing will vary with the type of wheel suspension employed, as applied to the pivoted link type of suspension herein disclosed, in which the links assume different angular positions with respect to the road wheel in passing over an uneven roadbed, the outer portion of the fairing is directly connected with the road wheel while the inner portion of the fairing is arranged to engage and move with the lower link as the latter rises and falls and to move with respect to the lower link as the wheel is turned for steering. Thus the construction may include a bracket 42 secured to the fairing and provided with an upstanding arm 43 having a ball and socket connection 45 with the road wheel member 19 of the steering knuckle, the socket portion of this connection being secured to or formed integrally with the member 19. The center of the connection 45 is disposed in the axis of the steering knuckle 19, 20. At its inner generally semi-circular side the fairing 40 may be provided with an upstanding lip 48 having a rolled edge which is arranged to engage with anti-friction and anti-squeak linings 49 secured to brackets 50 which are in turn fastened to the underside of the lower link 28 and torque arm 29. Leaf springs 52, which are provided at their outer ends with similar linings 54 for engagement with the underside of the fairing 40 and which resiliently maintain the latter in contact with the link and torque arm, are secured as indicated at 55 to the lower side of the latter. These linings serve as guides for the fairings; other types of guide may be substituted therefor, for example anti-friction rollers or the like.

In order that each fairing 40 may be constrained to execute steering movements with its associated road wheel 10, a connection with the road wheel or with its steering linkage may be effected as shown more particularly in Figure 5. Thus the fairing may be apertured to receive a bushing 57 of rubber or other deformable material, this bushing surrounding and gripping a downwardly extending projection 58 on a member 60, the latter affording the socket element of a ball joint connection with a road wheel steering arm 61, as indicated generally at 62, and being secured by means of a clamping element 64 to the outer end of a steering tie rod 65, the latter being connected to a centrally disposed steering lever 66 which is in turn actuated by conventional steering gear in a manner well understood. The road wheel steering arm 61 is rigid with the member 19 of the steering knuckle and the projection 58 is disposed in the axis of the pivotal connection between the tie rod and the steering arm, so that during steering movement of the road wheel, the associated fairing 40 swings about the ball and socket connection 45 and thus about the steering knuckle axis, sliding on the linings 49 and 54 and maintaining the lower wheel pocket opening substantially closed, the linings serving as guides for the fairings. The employment of a rubber connection between the fairings and the steering linkage damps vibration in the fairings and avoids looseness and rattling at a point where wear is likely to cause play between the cooperating parts. If desired the rubber bushing may be surface bonded to the fairings and the members 60, for example by vulcanization.

When the road wheels move vertically in passing over an uneven road bed, the associated fairings 40 will also rise and fall slightly, but such movement does not seriously adversely impair the effectiveness of the fairings in providing a continuation of the under panel 14 and the fairings function in all positions to prevent air flow in substantial volume into the wheel pockets. This function is particularly important where, as herein described, the steerable road wheels are located at the forward end of the vehicle since it is usually adjacent this point that the air tends to separate and spread and the greatest difficulties in maintaining smooth and continuous flow are experienced.

It is found that interruption to the smooth flow of air past the sides of the vehicle body is not seriously adversely affected by lateral wheel pockets, since the pressure at the side of the vehicle is not high and since the side faces of the wheels may be disposed substantially in the planes of the side panels of the body, forming in effect continuations thereof. It is nevertheless obvious that lateral wheel fairings, properly designed to accommodate the steering movements of the wheels, may be employed in connection with the lower wheel pocket fairings shown herein if desired.

It will be appreciated that the fixing of the lower wheel pocket fairings against vertical displacement would require undue decrease of the road clearance since it would be necessary to lower the fairings and under panel to an extent sufficient to permit free downward movement of the elements of the suspension. By providing for downward displacement of the fairings with the associated road wheels, the conventional practice in respect of road clearance may be followed.

The fairings 40 may be provided with louvres or slots to permit a limited flow of air into the wheel pockets for cooling the brakes. The employment of other methods of brake cooling is nevertheless preferable if maximum aerodynamic efficiency is to be attained.

Having thus described the invention, what is claimed as new and desired to be secured by Letters Patent is:

1. In a motor vehicle, the combination with a vehicle body having a contour conducive to the maintenance of a smooth flow of air thereover and including a generally flat and uninterrupted lower surface, of steerable road wheels partially housed within said body, wheel suspension means supporting said wheels for rising and falling movement with respect to said body, said lower surface being formed with openings through which said road wheels extend, said openings being formed to permit of horizontal swinging movement of said wheels in steering, and closure members for said openings supported for swinging movement with said wheels and for vertical displacement as said wheels rise and fall.

2. In a motor vehicle, the combination with a vehicle body having a substantially continuous lower panel extending beneath the major portion of the body, of vehicle suspension means including road wheels, one pair of road wheels being steerable, said lower panel having openings therein through which the lower portions of said road wheels depend, and means partaking of steering movement with said steerable road wheels and for vertical displacement as said wheels rise and fall for closing the unoccupied portions of the associated openings.

3. In a motor vehicle, the combination with a vehicle body having a contour conducive to the maintenance of a smooth flow of air thereover and including a generally flat and uninterrupted lower surface, of steerable road wheels partially housed within said body, said lower surface being formed with openings through which said road wheels extend, said openings being formed to permit of horizontal swinging movement of said wheels in steering, and closure members for said openings supported for such swinging movement with said wheels and for vertical displacement as said wheels rise and fall, said closure members extending inwardly from said wheels and affording lower surfaces substantially coplanar with the lower surface of said body.

4. In a motor vehicle, the combination with a vehicle body having a contour conducive to the maintenance of a smooth flow of air thereover and including a generally flat and uninterrupted lower surface, of steerable road wheels partially housed within said body, wheel suspension means supporting said wheels for rising and falling movement with respect to said body, said lower surface being formed with openings through which said road wheels extend, said openings being formed to permit of horizontal swinging movement of said wheels in steering, and closure members for said openings supported for swinging movement with said wheels and for downward movement as said wheels are depressed to afford adequate clearance for said suspension means in the lower positions of the latter.

5. In a motor vehicle, the combination with a vehicle body having a substantially continuous under panel, of road wheels disposed at opposite sides of said body, openings in said panel for said wheels, suspension means yieldably connected to said body and pivotally connected to said wheels, and fairings disposed in the unoccupied portions of said openings and connected to said suspension means for rising and falling movement therewith.

6. In a motor vehicle, the combination with a vehicle body having a substantially continuous under panel, of road wheels disposed at opposite sides of the body, openings in said panel for said wheels, suspension means for said wheels supported on said body for rising and falling movement with respect thereto, and fairings for said openings movable with said suspension means.

7. In a motor vehicle, the combination with a vehicle body having a substantially continuous under panel, of steerable road wheels disposed at opposite sides of said body, openings in said panel for said wheels, suspension means yieldably connected to said body and pivotally connected to said wheels, and fairings disposed in the unoccupied portions of said openings and connected with said wheels for concurrent steering movement.

8. In a motor vehicle, the combination with a vehicle body having a substantially continuous under panel, of steerable road wheels disposed at opposite sides of said body, openings in said panel for said wheels, suspension means yieldably connected to said body and pivotally connected to said wheels, fairings disposed in the unoccupied portions of said openings and connected to said suspension means for rising and falling movement therewith, and means connecting said fairings with said wheels for concurrent steering movement.

9. In a motor vehicle, the combination with a vehicle body having a substantially continuous lower panel extending beneath the major portion of the body, of vehicle suspension means including road wheels, said lower panel having openings therein through which the lower portions of said road wheels depend, and means associated with said suspension means for downward movement therewith as said wheels move below the normal position thereof, said last named means being disposed in and serving to substantially close the unoccupied portions of said openings.

10. In a motor vehicle, the combination with a vehicle body having a substantially continuous lower panel extending beneath the major portion of the body, of vehicle suspension means including road wheels, said lower panel having openings therein through which the lower portions of said road wheels depend, and means carried by said suspension means for downward movement therewith as said wheels move below the normal position thereof, said last named means being disposed in and serving to substantially close the unoccupied portions of said openings, said last named means having a lower surface generally coplanar with said panel.

11. In a motor vehicle, the combination with a vehicle body having a substantially continuous lower panel extending beneath the major portion of the body, of vehicle suspension means including road wheels, said lower panel having openings therein through which the lower portions of said road wheels depend, and devices engaging said suspension means and rising and falling therewith during vertical movement of the wheels, said devices serving to close the major part of the unoccupied portions of said openings.

12. In a motor vehicle, the combination with a vehicle body having a generally continuous under panel provided with openings, of steerable road wheels disposed in said openings, fairings positioned in the unoccupied portions of said openings, and means supporting said fairings for steering movement with said wheels and for depression when said wheels move downwardly.

13. In a motor vehicle, the combination with a vehicle body having a generally continuous under panel provided with openings, of steerable road wheels disposed in said openings, fairings positioned in the unoccupied portions of said openings, and means supporting said fairings for steering movement with said wheels, said means comprising a connection including rubber between each of said wheels and the associated fairing.

14. In a motor vehicle, the combination with a vehicle body having a generally continuous under panel provided with openings, of steerable road wheels disposed in said openings, laterally extending wheel supporting links pivoted to said body and said wheels, fairings supported in the unoccupied portions of said openings, and means connecting said fairings and wheels for concurrent steering movement.

15. In a motor vehicle, the combination with a vehicle body having a generally continuous under panel provided with openings, of steerable road wheels disposed in said openings, laterally extending wheel supporting links pivoted to said body and said wheels, fairings disposed in the unoccupied portions of said openings, and means connecting said fairings with said wheels and certain of said links for rising and falling movement therewith and for steering movement with said wheels.

16. In a motor vehicle, the combination with a vehicle body having a generally continuous under panel provided with openings, of steerable road wheels disposed in said openings, laterally extending wheel supporting links pivoted to said body and said wheels, fairings disposed in the unoccupied portions of said openings, and means connecting said fairings with said wheels and certain of said links for rising and falling movement therewith and for steering movement with said wheels, said last named means including guides on said links for said fairings.

17. In a motor vehicle, the combination with a vehicle body having a generally continuous under panel provided with openings, of steerable road wheels disposed in said openings, laterally extending wheel supporting links pivoted to said body and said wheels, fairings disposed in the unoccupied portions of said openings, and means connecting said fairings with said wheels and certain of said links for rising and falling movement therewith and for steering movement with said wheels, said last named means including guides on said links for said fairings and pivotal connections between said fairings and wheels in the steering axes of the latter.

FRANK C. BEST.